(12) United States Patent
Erickson

(10) Patent No.: US 10,165,732 B2
(45) Date of Patent: Jan. 1, 2019

(54) AERIAL FLUID APPLICATION TECHNOLOGY FOR ORCHARDS, VINEYARDS AND THE LIKE

(71) Applicant: Stewart E. Erickson, Hudson, WI (US)

(72) Inventor: Stewart E. Erickson, Hudson, WI (US)

( * ) Notice: Subject to any disclaimer, the term of this patent is extended or adjusted under 35 U.S.C. 154(b) by 15 days.

(21) Appl. No.: 15/153,083

(22) Filed: May 12, 2016

(65) Prior Publication Data
US 2017/0325411 A1 Nov. 16, 2017

(51) Int. Cl.
| | |
|---|---|
| *A01G 7/02* | (2006.01) |
| *B05B 9/03* | (2006.01) |
| *B05B 13/02* | (2006.01) |
| *B05B 15/622* | (2018.01) |
| *B05B 15/68* | (2018.01) |
| *B05B 15/625* | (2018.01) |
| *A01G 13/06* | (2006.01) |

(52) U.S. Cl.
CPC ............... *A01G 7/02* (2013.01); *A01G 13/06* (2013.01); *B05B 9/035* (2013.01); *B05B 13/0278* (2013.01); *B05B 15/622* (2018.02); *B05B 15/625* (2018.02); *B05B 15/68* (2018.02)

(58) Field of Classification Search
CPC ... B05B 9/035; B05B 13/0278; B05B 15/062; B05B 15/063; B05B 15/08; A01G 7/02
USPC .......................................................... 239/1
See application file for complete search history.

(56) References Cited

U.S. PATENT DOCUMENTS

| | | | |
|---|---|---|---|
| 4,003,160 A * | 1/1977 | Muller ..................... | A01G 7/02 |
| | | | 435/255.2 |
| 4,012,867 A * | 3/1977 | Lainchbury .............. | A01G 9/18 |
| | | | 47/17 |

(Continued)

OTHER PUBLICATIONS

Goorahoo, Cassel, Carstenson, Ashkan, Crop Growth Enhancement with CO2 Injection into the Crop Canopy with Drip Irrigation, CIT Final Report—Apr. 2003.

(Continued)

*Primary Examiner* — Chee-Chong Lee
(74) *Attorney, Agent, or Firm* — Skinner and Associates; Joel Skinner

(57) ABSTRACT

A system, device and method for delivering CO2 or other gases to plants in fields, orchards, vineyards and the like. A stake with a windbreak structure and gaseous emitters on the upwind side creates a leeward wind eddy surrounding a plant, such as an orchards sapling. This establishes and maintains a gaseous microclimate beneficial to the plant. The device delivers $CO_2$ gas to a plant in an agricultural field, orchard, grove, orchard of the like. The device includes an elongated base adapted to be adjustably placed on the ground a predetermined distance from the plant, upwind of the plant. A wind foil is adjustably connected to the base along its elongated length. The wind foil has a curvilinear geometry with a first face having a generally convex configuration, and a second face having a generally concave configuration. An emitter assembly is disposed on the second face of the wind foil. A gas supply conduit is communicatively connected to the emitter and adapted to be connected to a gas supply. A system including multiple devices and a method of making and using the device and system are also disclosed.

16 Claims, 14 Drawing Sheets

(56) References Cited

U.S. PATENT DOCUMENTS

| | | | |
|---|---|---|---|
| 4,073,089 A * | 2/1978 | Maginnes | A01G 9/18 |
| | | | 47/17 |
| 5,409,508 A | 4/1995 | Erickson | |
| 5,584,311 A * | 12/1996 | Schaefer | E04H 15/34 |
| | | | 135/120.3 |
| 5,682,709 A | 11/1997 | Erickson | |
| 6,108,967 A | 8/2000 | Erickson | |
| 6,237,284 B1 | 5/2001 | Erickson | |

OTHER PUBLICATIONS

Hsiao, Molina, Matista, Qiu, Assessing CO2 Enrichment of Air Adjacednt to Crop Canopies in the Field, Final Report, Mar. 28, 2003.

Shrestha, Ashkan, Goorahoo, Carstensen, Crop-Weed Competition as Influenced by Elevated CO2, University of CA.

* cited by examiner

AERIAL FLUID APPLICATION TECHNOLOGY FOR ORCHARDS, VINEYARDS AND THE LIKE

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to agricultural and horticultural systems, apparatus and methods. More particularly, the invention relates to systems, apparatus, and methods to effectuate delivery of beneficial or sustaining fluids to components of plants residing in an elevated condition in relation to the ground. Most particularly, such fluids are gases delivered to leaves/canopy of plants in orchards, vineyards, and the like. The invention is especially suitable for delivery of $CO_2$ gas.

2. Background Information

Plants obtain their water requirement from the soil via their root systems. Less known, but equally important, is that the $CO_2$ requirement comes from the air via the leaves. In the presence of sunlight, plants combine carbon from $CO_2$ with water to produce carbohydrates and oxygen—photosynthesis;

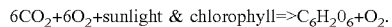

$$6CO_2 + 6O_2 + \text{sunlight \& chlorophyll} => C_6H_2O_6 + O_2.$$

Increasing the air's daytime $CO_2$ concentration accelerates photosynthetic activity inducing the plants to become heartier and to produce more, larger and healthier fruits, vegetables and root systems. The crops are more disease resistant and the whole process is deemed organic by the USDA.

Of further importance is that as plants acquire $CO_2$ from the air via their leaves, they lose water vapor through this same mechanism. This water loss, known as transpiration, is significant. The leafs gaseous exchange. $CO_2$ in and water vapor out, is regulated by microscopic orifices called "stomata" located predominantly on the underside of leaves. $CO_2$ regulates the size of the stomata opening. When plenty of $CO_2$ available and the apertures close, reducing water loss. With an ambient $CO_2$ deficit, the apertures open, greatly increasing the plant's water loss. Thus, stomatal closure induced by the application of $CO_2$ has at least the following benefits: (1) the rate of water loss declines thereby decreasing the plant's water requirements and increasing the water-use efficiency (yield/unit of water); (2) it reduces the plant's vulnerability to drought; and, (3) it stems the inducement of harmful air pollutants into the plant's metabolic processes The third aspect is particularly beneficial in the notably highly delterious ozone pollution synonymous with Central Valley, Calif. air quality.

While greenhouse and other closed plant growth environments have made in roads to leveraging the foregoing principles, the distrinbution, application, and effective retention of $CO_2$ in outdoor settings has generally been a non-starter for various reasons. Be that as it may, with global population growth and rising affluence in developing nations, significant demands are being placed upon fresh-water supplies while stretching farmers' ability to produce enough quality food to meet rising demand. At the same time, the grim realization that $CO_2$ emissions are a global threat and corporate liability has government officials and corporate executives seeking answers.

In light of the foregoing, it is believed especially advantageous to provide improved $CO_2$ enrichment technology for effective and efficient distribution, application and retention of $CO_2$ gas to large, open-field tracts of farmland so as to envelope plants' leaves with $CO_2$ gas. Moreover, it is believed desirable and advantageous to provide a sapling windbreak or the like which magnifies $CO_2$ residency, enables higher $CO_2$ concentrations, reduces $CO_2$ costs, and enables other agronomic functions. More particularly still, it is believed that a low cost, high durability, high efficiency, reliable sapling growth system, in kit form or otherwise, is desirable, with select stake and windbreak and adjustable elements believed to be especially advantageous so as to increase the systems' capabilities commensurate with sapling growth.

Younger saplings are key to the orchard production. It takes 5-6 years to get the orchards into production with substantial investment capital tied up for years in advance of the orchard and/or vineyard's production and payout. By applying CO2 gas to the young saplings as much as one or two years could be knocked off the production cycle which would have significant financial benefits to orchard and vineyard owners. Moreover, in the early years of the orchard, the juvenile saplings are very susceptible to costly mortality so it would be highly desirable to provide the saplings with CO2 to increase their vigor, reduce water stress and improve resiliency to a whole package of environmental stresses that lead to mortality. Unfortunately, because the trees are planted on such great spacing to allow for a full canopy later in life, they do not control the microclimate within the orchard and wind within the orchard in the early years. An older orchard would also benefit by having broadcast CO2 application.

Many orchards and notably the nut orchards are harvested with big mechanical shakers that grab the trunk of the tree and literally shake all the nuts off the tree. The embodiments of the invention for applying CO2 gas avoid interfering with this highly automated process and allow the machine to quickly approach the trunk of the tree and grab hold of it as circumstances warrant.

Existing technology is believed to have significant limitations and shortcomings. For these and other reasons, a need exists for the present invention.

All US patents and patent applications, and all other published documents mentioned anywhere in this application are hereby incorporated by reference in their entirety.

BRIEF SUMMARY

The present invention provides a system, apparatus and method which are practical, reliable, and efficient, and which is believed to fulfill a need and to constitute an improvement over the background technology.

In a first aspect, the invention provides device for delivering a gas to a plant, comprising: a base adapted to be placed on the ground a predetermined distance from the plant, an emitter assembly adjustably disposed on the base, and a gas supply conduit communicatively connected to the emitter and adapted to be connected to a gas supply.

In a second aspect, the invention provides a device for delivering $CO_2$ gas to a plant in an agricultural field, orchard, grove, orchard of the like, comprising:

(a) an elongated base adapted to be adjustably placed on the ground a predetermined distance from the plant, upwind of the plant;

(b) a wind foil adjustably connected to the base along its elongated length, the wind foil having a curvilinear geometry with a first face having a generally convex configuration, and a second face having a generally concave configuration;

(c) an emitter assembly disposed on the second face of the wind foil; and (d) a gas supply conduit communicatively connected to the emitter and adapted to be connected to a gas supply.

In a third aspect, the invention provides a system for delivering a gas to a plant comprising:

(a) a plurality of gas delivery devices, each gas delivery device including: a base adapted to be placed on the ground a predetermined distance from the plant, an emitter assembly adjustably disposed on the base, and a gas supply conduit communicatively connected to the emitter and adapted to be connected to a gas supply; and (b) at least one gas supply line connected to a gas source.

And in a fourth aspect, the invention provides a method of delivering $CO_2$ gas to a plant in an agricultural field, orchard, grove, orchard of the like, comprising:

(a) providing at least one CO2 delivery device including:
(i) an elongated base adapted to be placed on the ground a predetermined distance from the plant,
(ii) a wind foil adjustably connected to the base along its elongated length, the wind foil having a curvilinear geometry with first having a generally convex configuration and second face having a generally concave configuration,
(iii) an emitter assembly disposed on the second face of the wind foil, and
(iv) a gas supply conduit communicatively connected to the emitter and adapted to be connected to a gas supply (b) placing the at least one gas emitting device on the ground a predetermined distance from the plant, upwind of the plant; and (c) providing $CO_2$ gas to the gas supply conduit;

(d) a $CO_2$ gas envelope is formed around a portion of the foliage of the plant and the gas envelope is shielded from wind by the wind foil so that it remains around the foliage a maximum period of time relative to wind conditions.

Other aspects, include: (A) a mechanism to effectively deliver beneficial or sustaining gaseous media from a pressurized source of gaseous media to the foliage of growing foliage crops; (B) a system to effectively deliver beneficial or sustaining gaseous media from a pressurized source of gaseous media to the foliage of growing foliage crops, the system characterized by one or more of either: a trellis, stake, or other means adapted to carry the gaseous media or suspended tubes and emitters; and (C) a method to effectively deliver beneficial or sustaining gaseous media from a pressurized source of gaseous media to the foliage of growing foliage crops, the method characterized by provisions of one or more of a trellis, stake or the like adapted to carry the gaseous media or suspended tubes and emitters.

The aspects, features, advantages, benefits and objects of the invention will become clear to those skilled in the an by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

DETAILED DESCRIPTION

The present invention provides a gaseous delivery system for establishing a microclimate around plants, particularly orchard and grove saplings and trees, and vineyards, to facilitate beneficial retention of CO2 in an above ambient parts per million concentration. The apparatus of the invention creates a leeward wind eddy, restricts air flow and dispersion to the outside air about the growing plant, and withholds the enriched gas in the area surrounding the foliar canopy of the plant.

Figure 1:
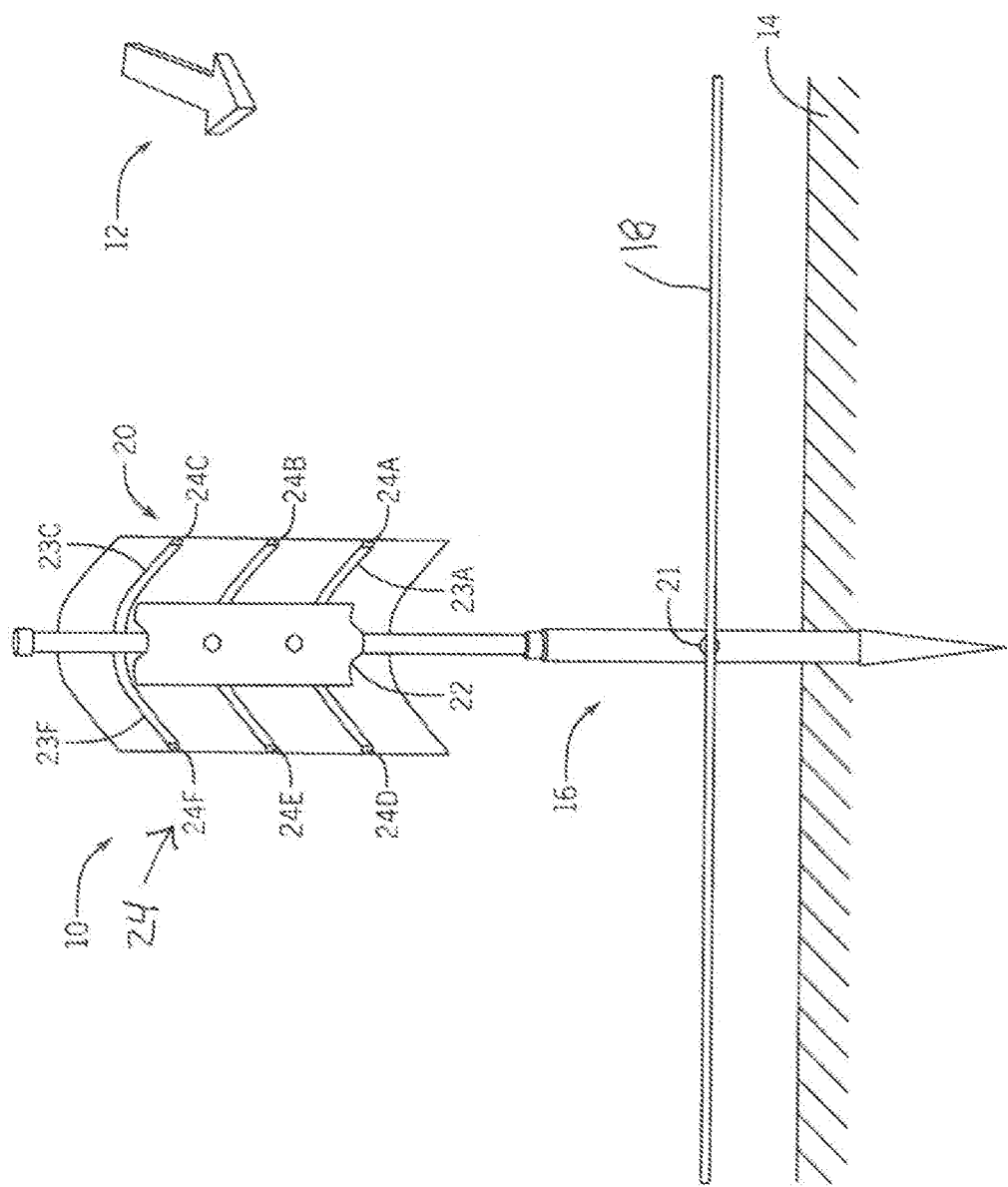
FIG. 1 illustrates an embodiment of a gas delivery device of the present invention.
Figure 2:
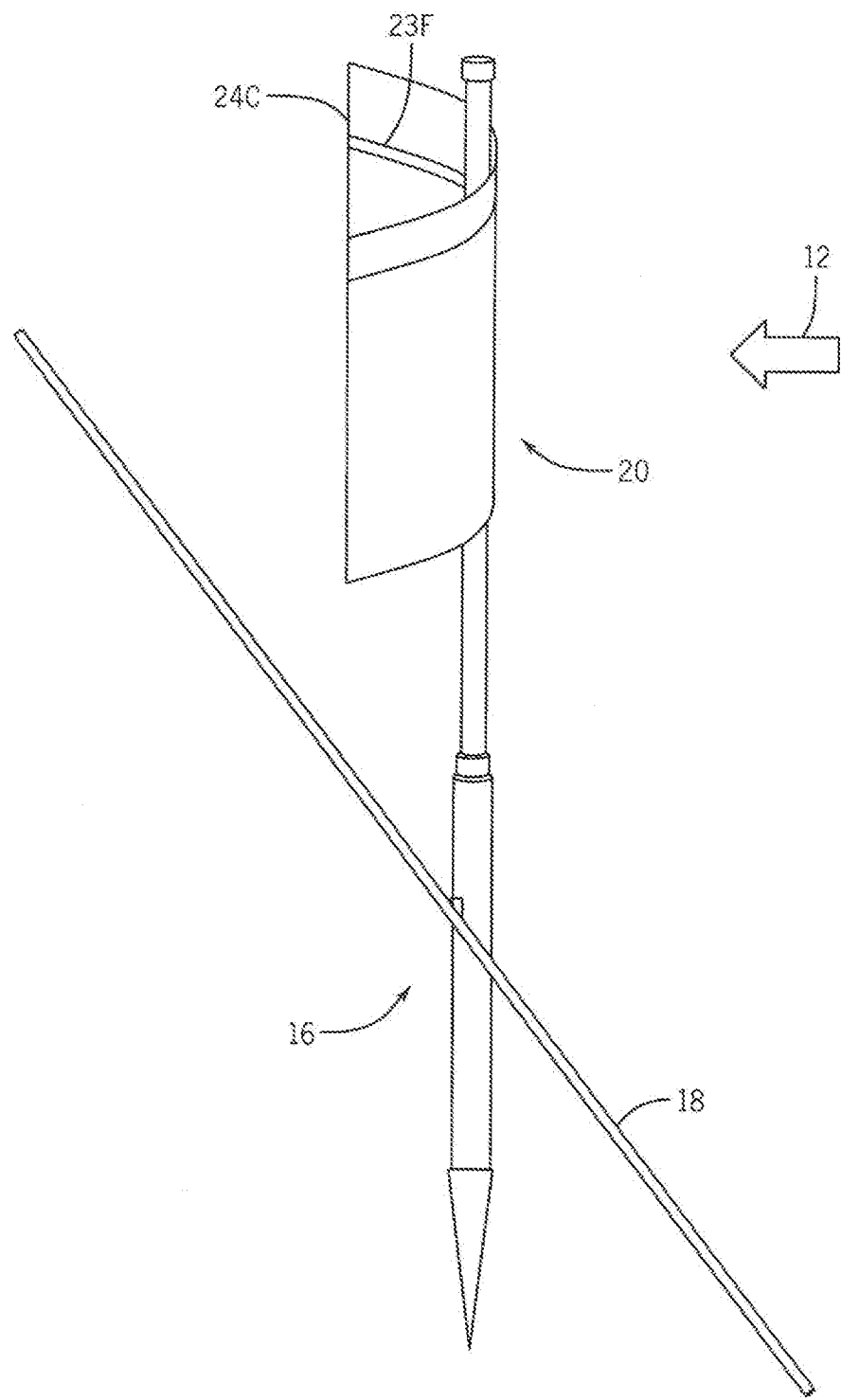
FIG. 2 is a side view of the gas delivery device.
Figure 3:
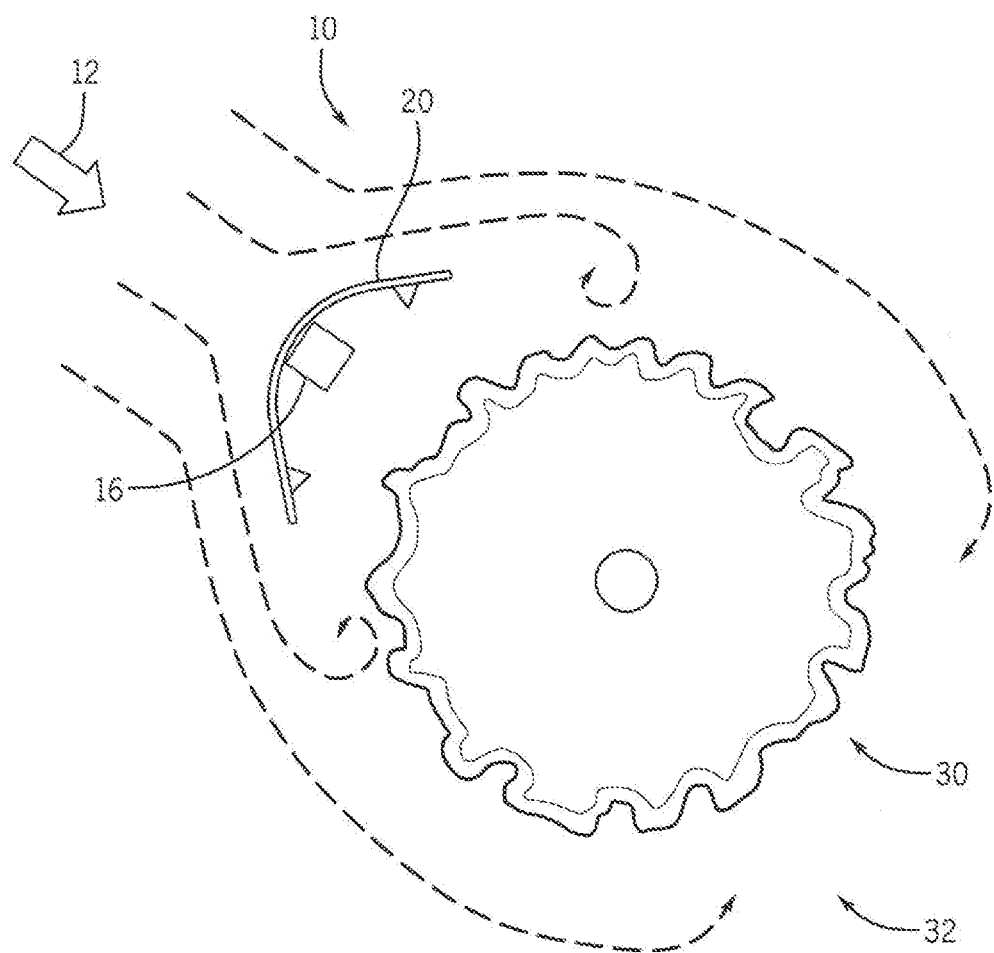
FIG. 3 is a top or plan view of the gas delivery device, operatively deployed upwind of a target plant.

FIGS. 1-3 show a basic embodiment of the agricultural gas application device 10 of the invention. The device 10 includes a base 16, a gas emitter 24, and a wind foil 20. The base 16 is placed on or in the ground at a predetermined position near the plant or group of plants that are targeted for gas application. The base 16 serves a platform for supporting the other elements of the device 10 in position relative to the plant or plants. In this embodiment, the base 16 is a telescoping conduit that is extendable and retractable to vary the length of the base 16. The base 16 has a pointed bottom end for insertion into the ground a predetermined depth. The gas emitter 24 is communicatively connectible to a supply of gas and emits gas to the plant or plants. The wind foil 20 shields the gas emitter 24 from the air flow from wind or breeze in the environment. In this embodiment, the wind foil 20 is a cup shaped structure with predetermined vertical and horizontal dimensions, and with a predetermined curvature. The foil 20 is preferably rigid or semi rigid so that it maintains it's structure in wind conditions present in the environment. Also in this embodiment, the gas emitter 24 consists of a plurality, for example six (6) emission ports 24 A-F. The ports 24 A-F are coupled to the foil 20, preferably at the vertical peripheral edges thereof. The ports 24A-F are communicatively connected to feed lines 23A-F that supply gas. In this embodiment, the feed lines 23A-F are coupled to the concave, downwind face of the foil 20. The convex face of the foil is oriented so that it directly or substantially faces the prevailing wind 12. The concave face of the foil 20 is coupled to the base 16 via a securement sleeve 22. The sleeve 22 is integrally formed with the foil 20 in this embodiment of the device 10. Further in this embodiment, the feed lines 23 are communicatively connected to a central, vertical gas lumen (not shown) of the base 16. The central lumen is communicatively connected to a gas supply line 18 near the bottom of the base 16. A line to base direct connector 21 preferably has an integrated valve. FIG. 3 shows the device 10 shown deployed relative to a plant 30 and adjustably oriented relative to the prevailing wind 12 to create an envelope or cloud 32 of CO2 or other gas surrounding the plant 30.

Figure 4:
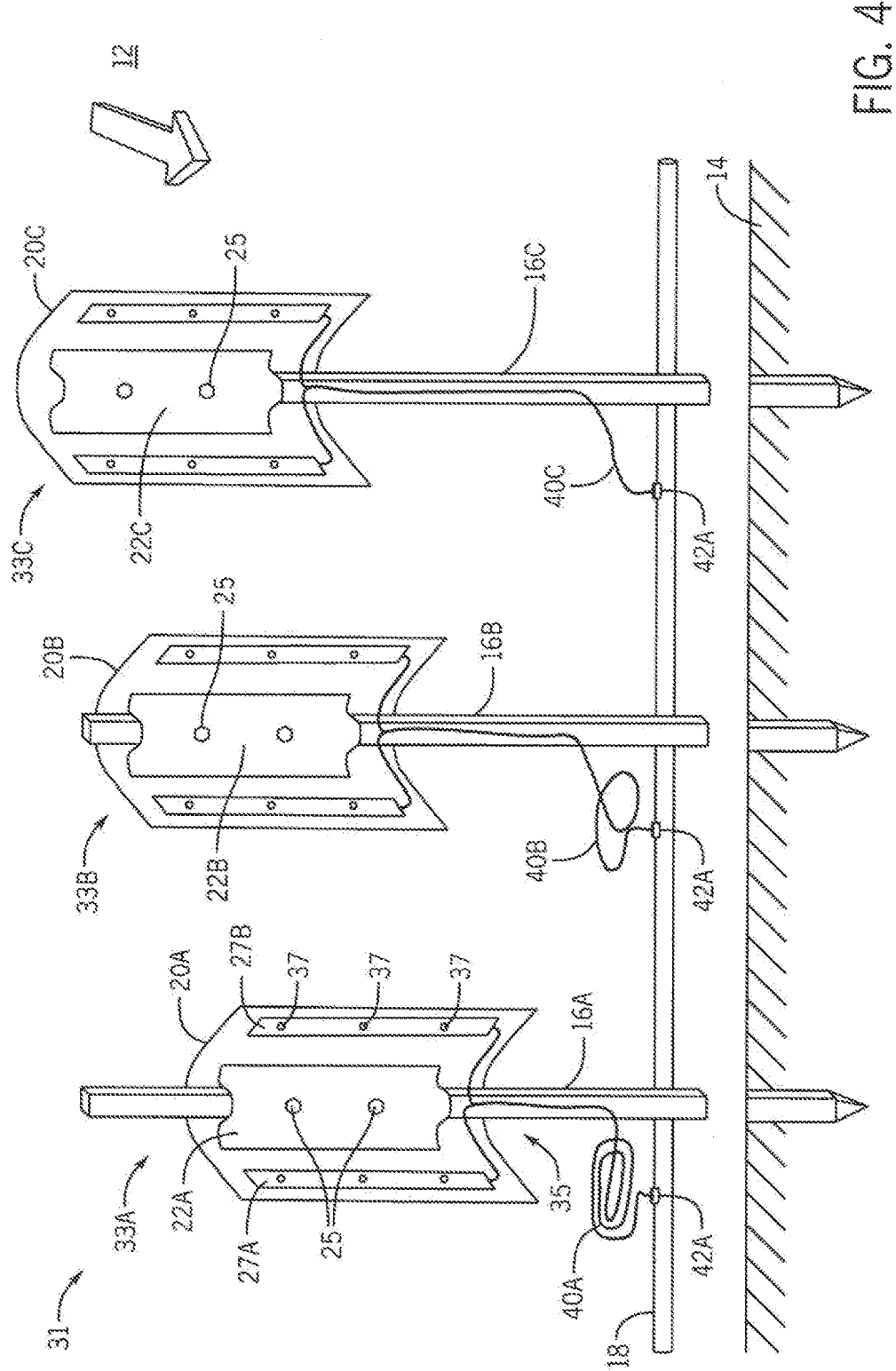
FIG. 4 illustrates an embodiment of a gas delivery system of the present invention.

FIG. 4 shows an agricultural gas application system 31 comprising a plurality of gas application devices 33A-C coupled to a gas supply line 18 by flexible conduit 40, for example a hose. Each hose 40A-C is connected to a port 42A-C in the supply line 18. Each gas application device 33 comprises a base 16, an emitter cup 20, and a securement sleeve 22 (which includes fastening bolts. In place of the channel/port structure 23/24 of the device embodiment 10 of FIGS. 1-3, this embodiment uses an emitter tape assembly which preferably includes first and second tape sections 27A and B. The tape sections 27 are connected to the gas hose 40 via an intermediate hose 35. The tape sections 27 have a plurality of emitter ports 37. The vertical position of the foils 20 is adjustable on the bases 16 via the sleeves 22.

Figure 5:
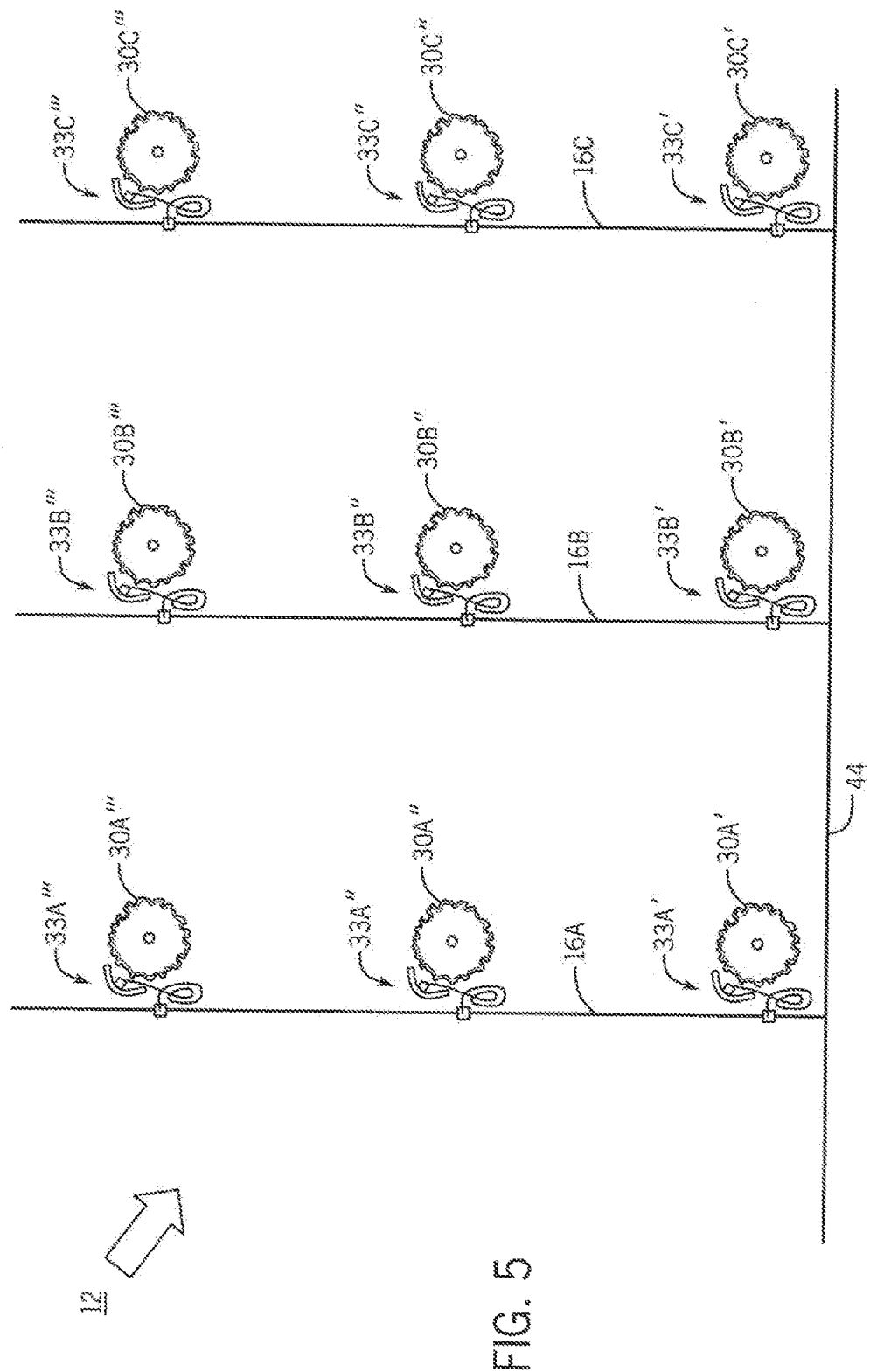
FIG. 5 is a top or plan view of the system, operatively deployed in an array of plant, for example an orchard.
Figure 6:
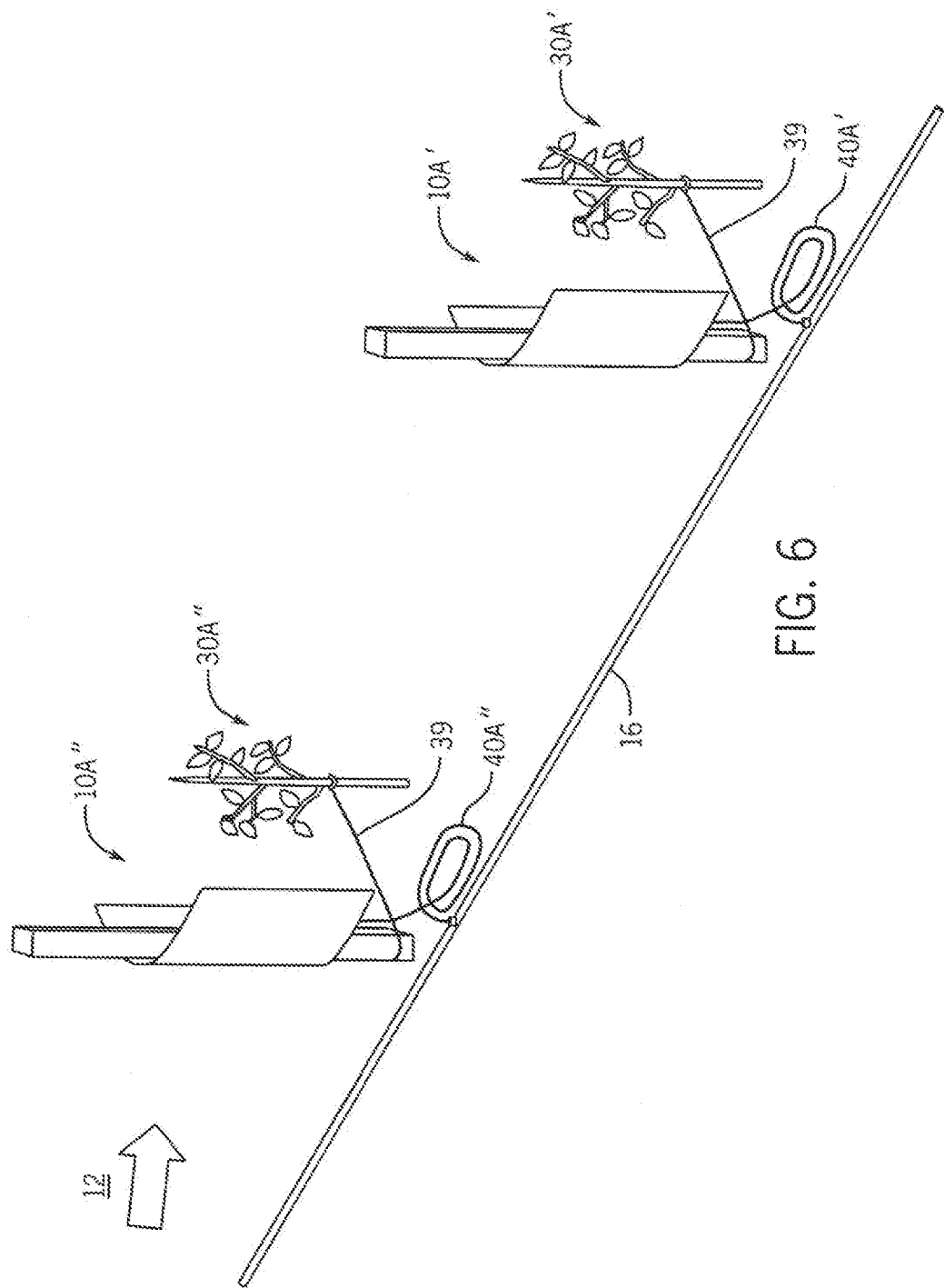
FIG. 6 illustrates the system deployed with small trees such as saplings in an orchard.
Figure 7:
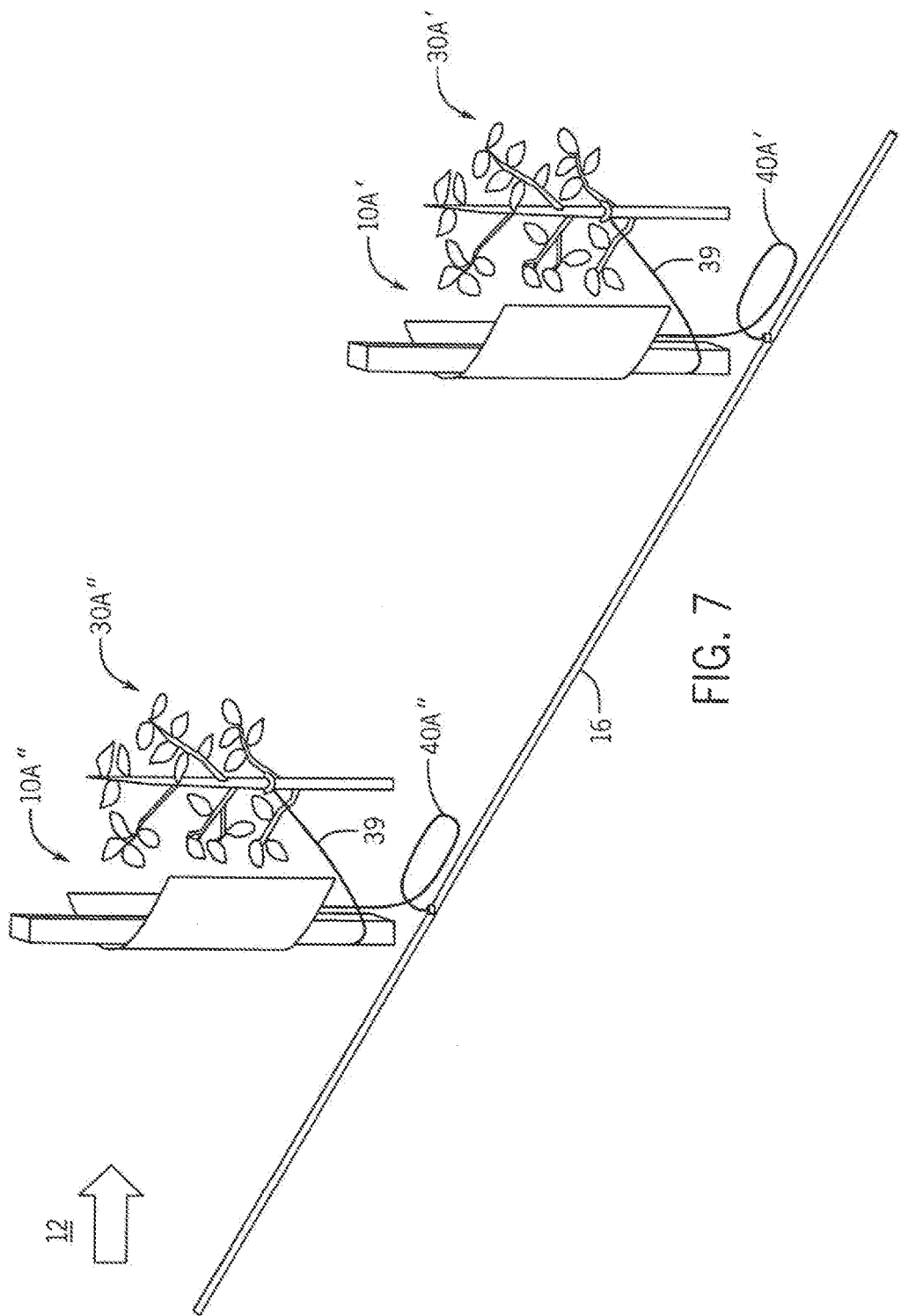
FIG. 7 shows the system adjusted for a first level of growth of threes, now medium size.
Figure 8:
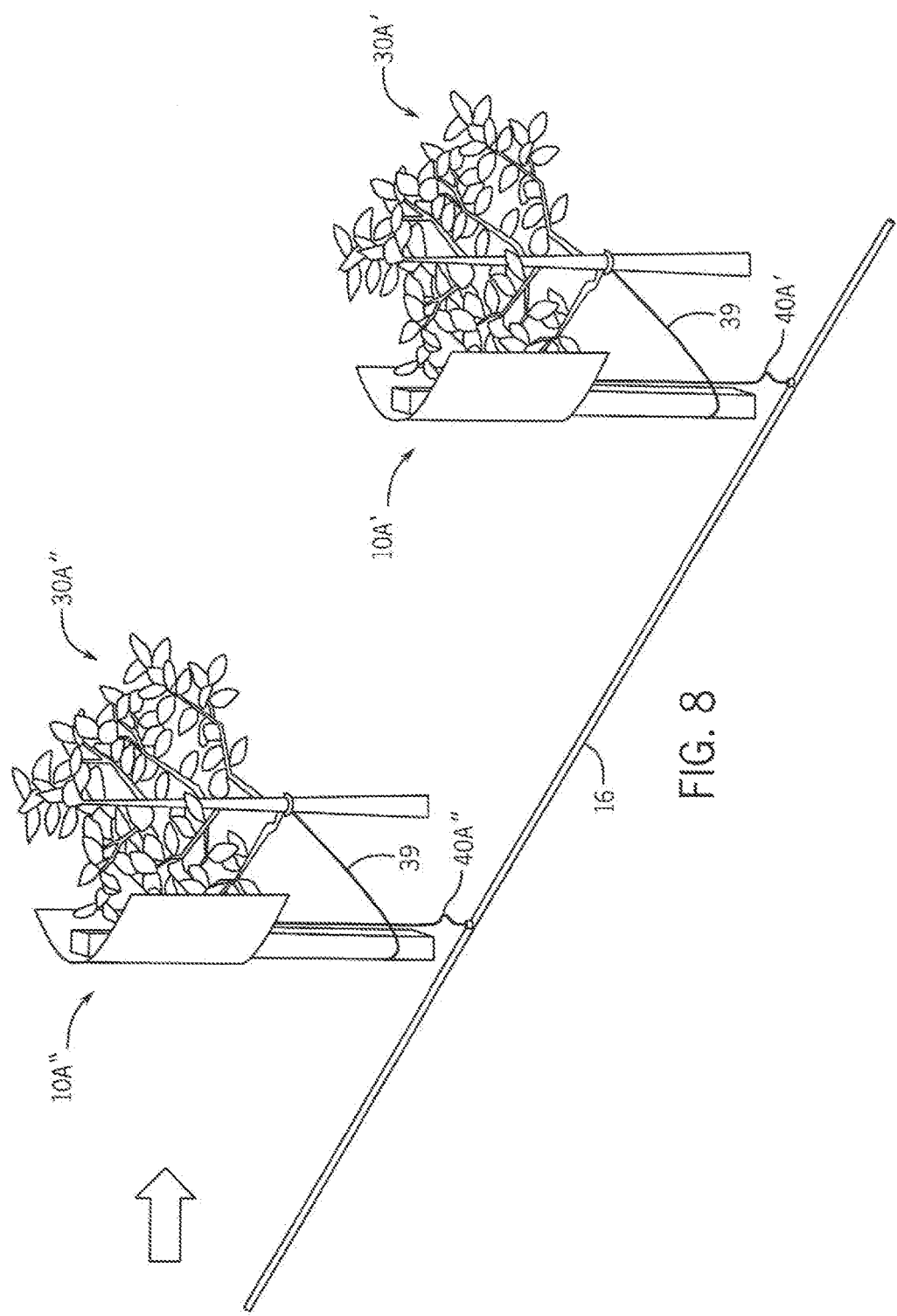
FIG. 8 shows the system further adjusted for a second level of growth of the trees, now larger still.
Figure 9:
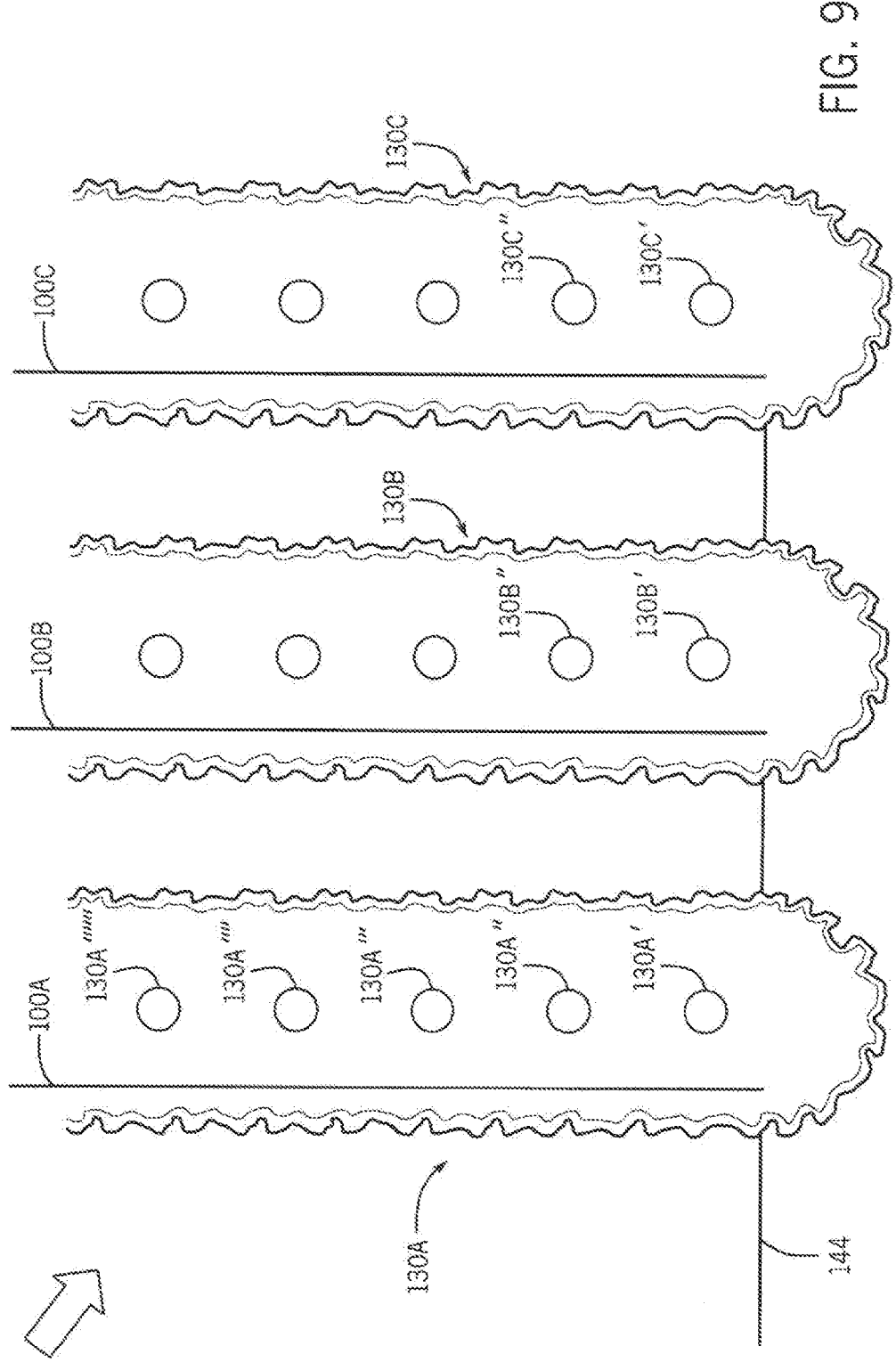
FIG. 9 illustrates another embodiment of the gas delivery system of the invention, with a plurality of emitter lines deployed in canopy of a set of plants, such as a citrus hedgerow. The view is a plan view.
Figure 10:
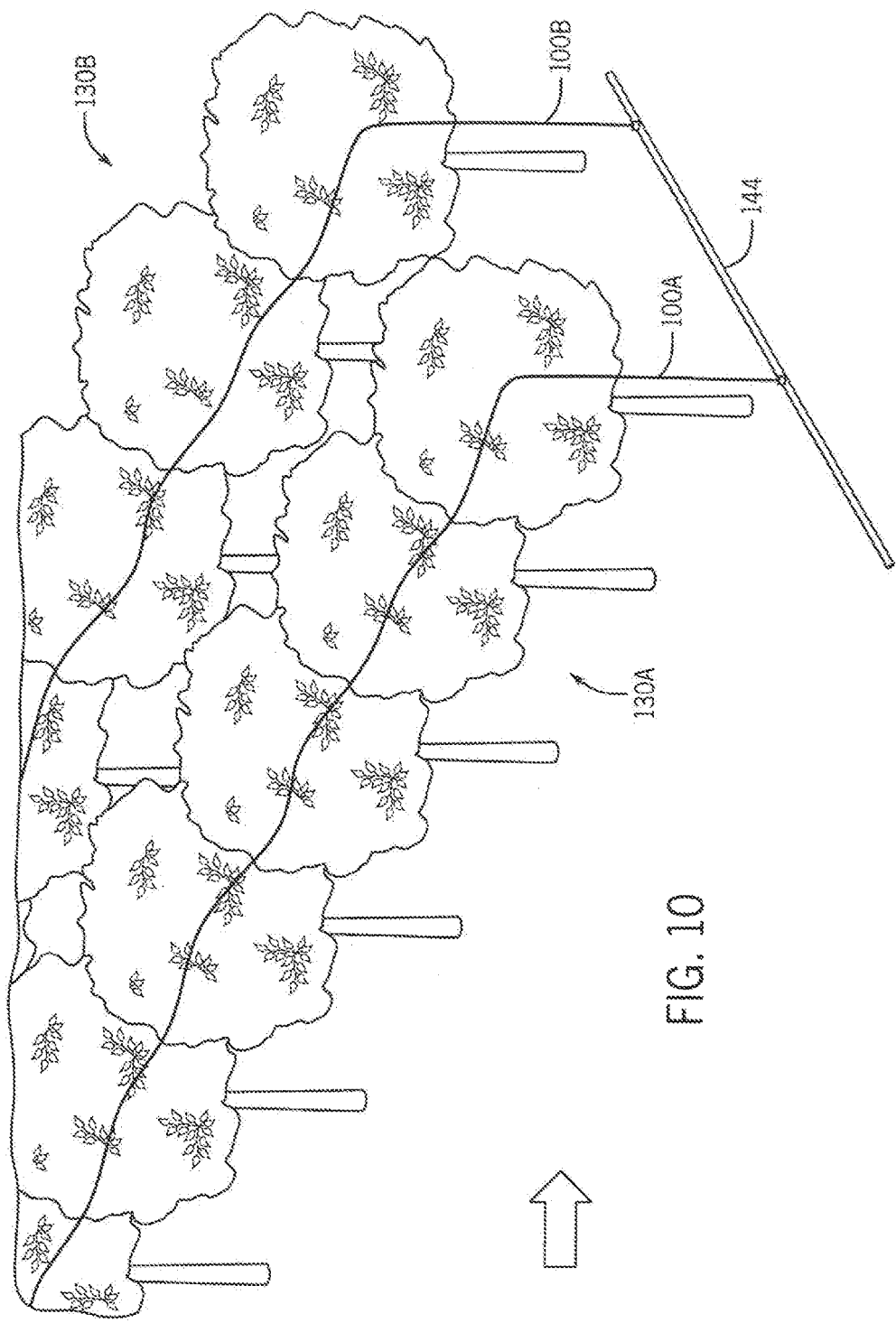
FIG. 10 is a further view of the system embodiment of FIG. 9; the view being oblique.
Figure 11:
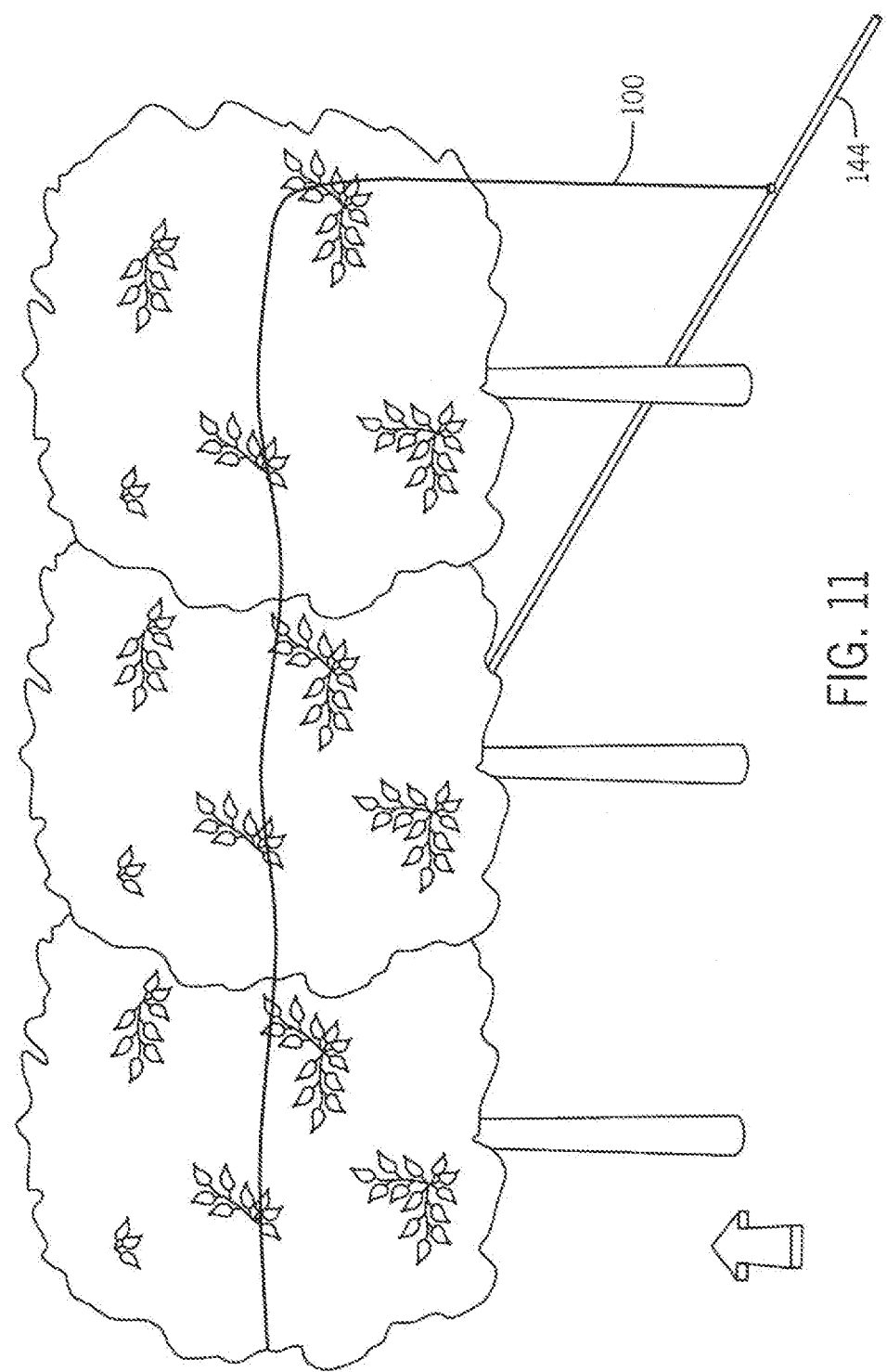
FIG. 11 is yet another view of the system; the view being a side view.
Figure 12:
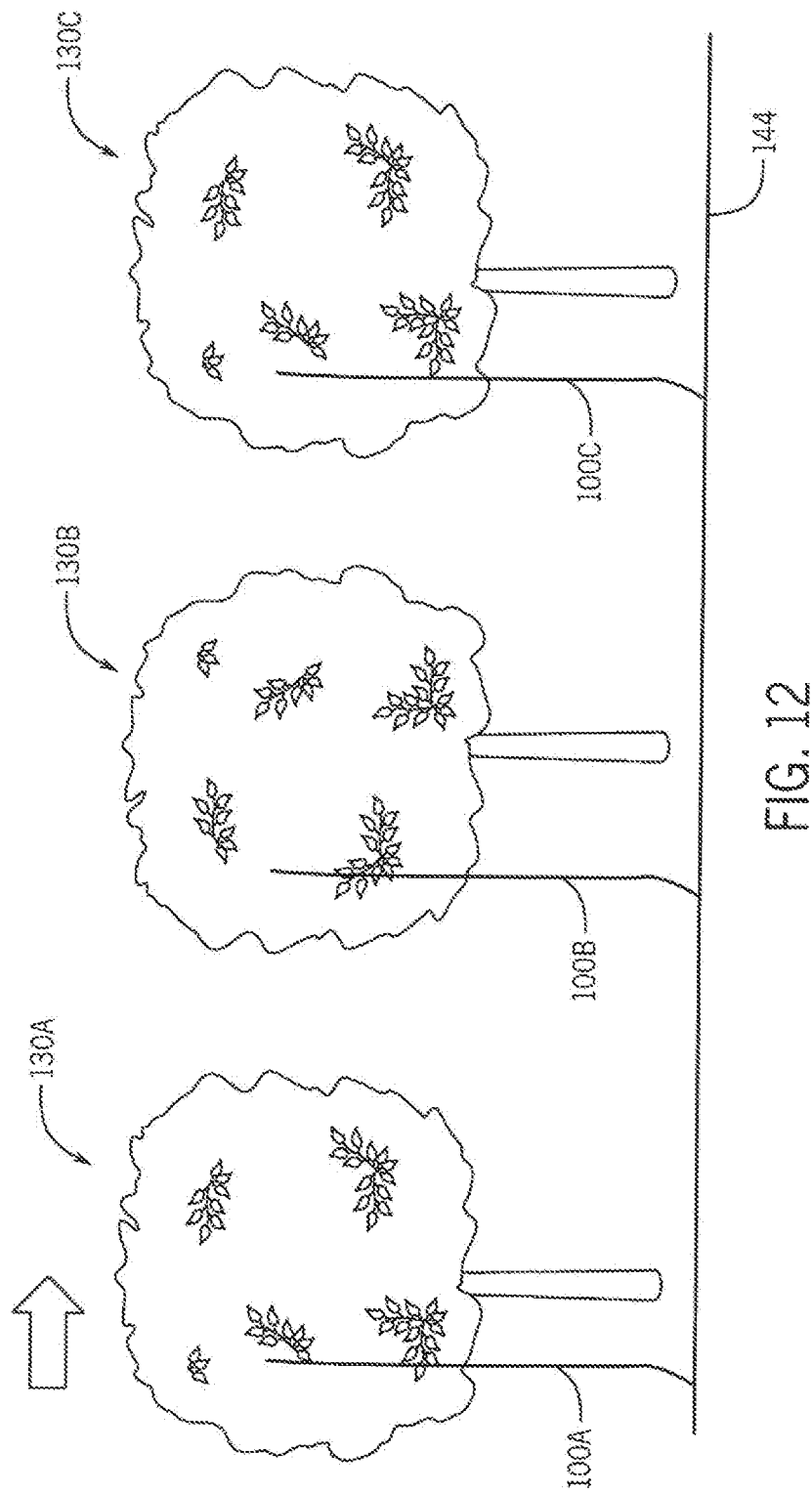
FIG. 12 is still another view of the system; the view being an end view.

FIG. 5 is a plan view of the system 31 including branch lines 16A-C off of the main gas line 44. Each branch line 16A-C has a plurality of gas application devices 33. FIGS. 6-8 illustrate how the system permits adjustment of the devices 33 while the plants grow from small saplings to maturity. Optional tether lines 39 stabilize the placement and function of the applicators 33 relative to the plants 30.

FIGS. 9-12 show another embodiment of the system and device of the invention. The device is an emitter line 100 and the system comprises a plurality of emitter lines 100A-C arranged in rows of plants. This embodiment is particularly well suited for citrus hedgerows, 130. The lines 100 are connected to a main supply line 144. The lines are shown disposed in the canopy of the citrus trees, on the up wind side of the tree trunks.

Figure 13:
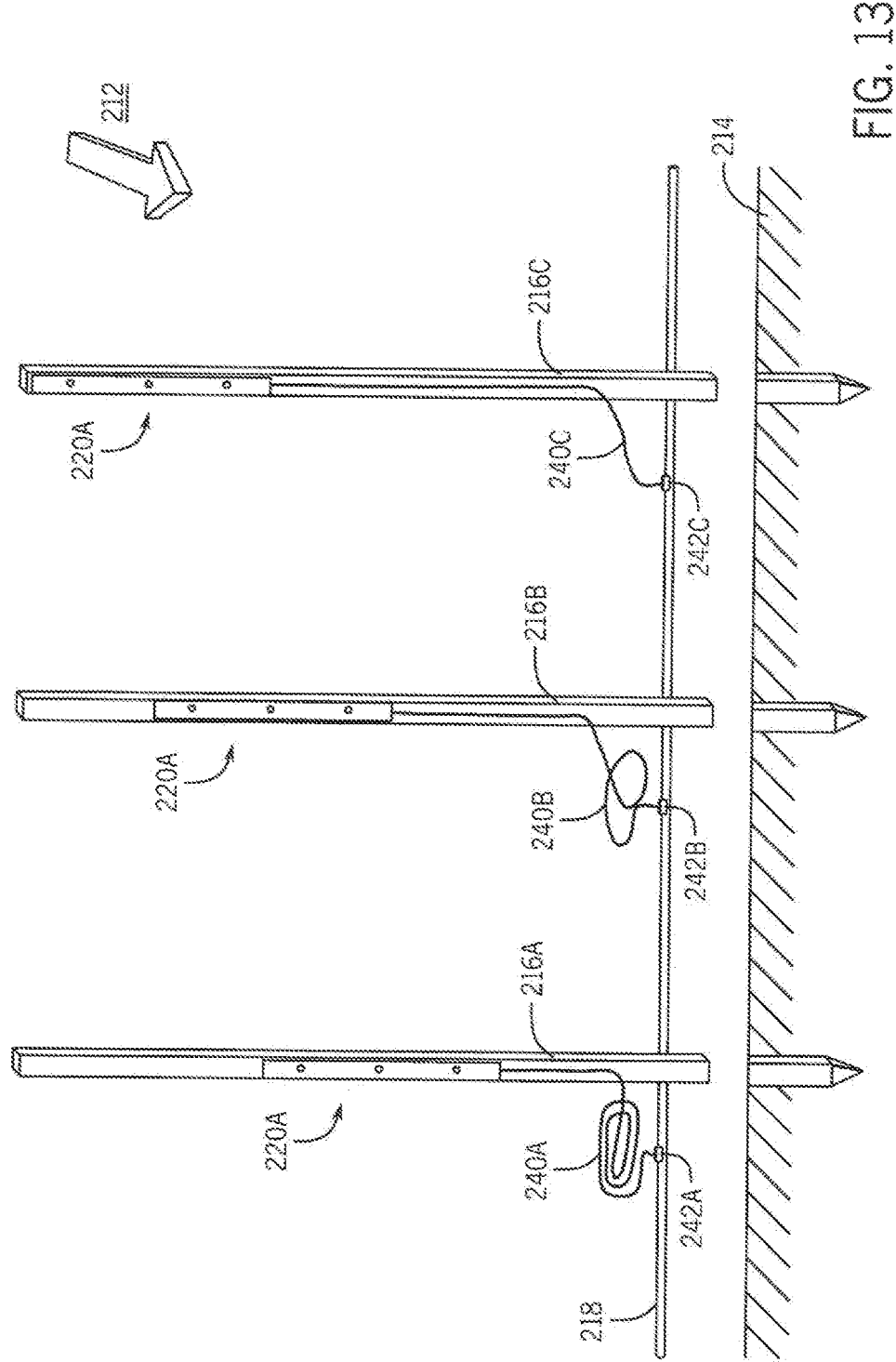
FIG. 13 illustrates a further embodiment of the gas delivery system of the invention, with another embodiment of the gas delivery device, the device employing an emitter tape. The view is a front view.
Figure 14:
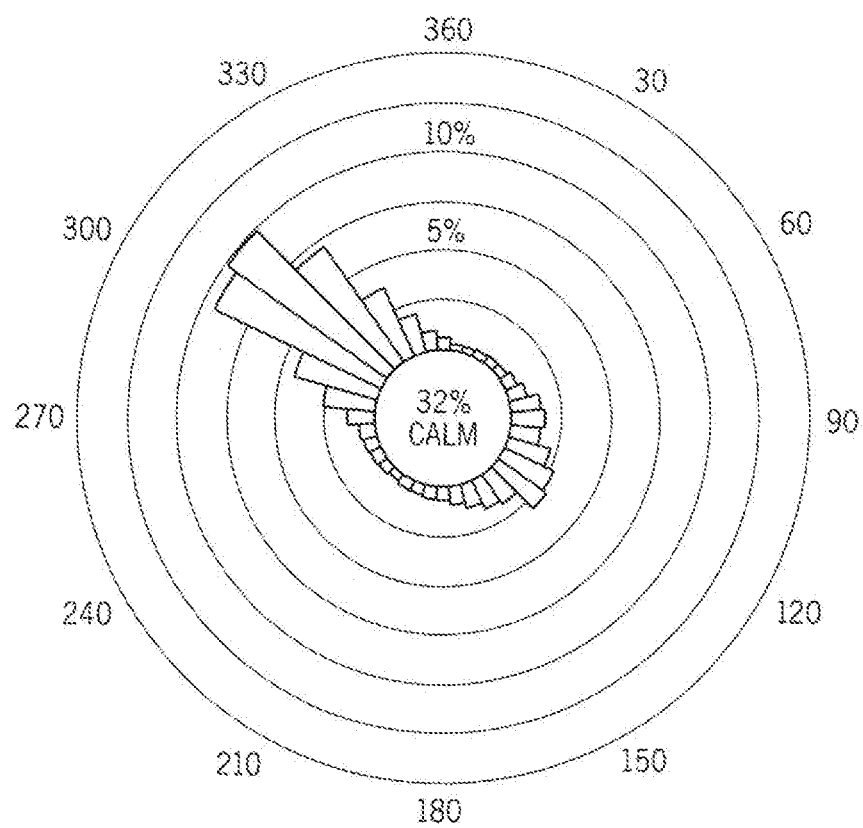
FIG. 14 illustrates a wind rose showing prevailing wind conditions.

FIG. 13 shows yet another embodiment of the device 220 including a base 216 and an emitter tape 220 (with a plurality of ports or apertures) disposed on base 216. The emitter tape 220 is connected to a supply line 218 via supply hose 240. The vertical position of the tape 220 may be adjusted on the base 216.

In use, the device, or a set or sets of devices, is disposed on the upwind side of the plant and is preferably releasably detachable near the ground-level for deployment between an active and inactive condition. A sleeve receptor may be placed in or on the ground (for example, a length of pipe or PVC with a slightly larger diameter than the stake), preferably located flush with the ground but firmly implanted in the ground, to support the structure during periods of high wind, to accept the above ground riser, providing quick detachment, for example during time of mechanically harvesting.

In a preferred embodiment, the entire apparatus may simply be extended or lifted up, and retained with respect thereto, while, for example, the mechanical harvesting means operatively engages the tree. Since the device has an open bottom and sides, the plant would not prevent nuts, fruits and the like, from falling, unimpeded, for collection and other agronomic functions to occur routinely.

The structure is preferably upwardly extendible or may receive a supplement or extender. For example, the structure may receive one or more upward sleeve extensions on posts or stakes, and to accommodate further upward windbreak encompassing the tree growth.

Once the targeted plants, for example orchard or grove trees, reach a maturity level for economically harvesting, the entire structure or set of structures can simply be removed, and relocated to a new orchard or grove that is in a juvenile growth stage of development and ready to have stakes and juvenile growth devices added. The windbreak element is sufficiently robust so as to weather, high wind events, without sailing, tearing or stripping. In one embodiment, a several mil thick plastic film or fabric is provided, more particularly and advantageously one characterized by slits, apertures, or the like, which may be in a particular lenticular or triangular shape being from a across up to 6" across with the attached edge forming a flap with the cut fabric. The fabric is geometrically slit in a generally equally spaced pattern of slits, but the slits are not so closely spaced as to impair the structural integrity of the material and make enclosure susceptible to damage in high winds, e.g., tearing. The purpose of the geometric pattern of slits and the resulting flaps is to maximize the containment of the CO2 gas from dispersion and movement in low wind conditions, but allow air to freely pass through the windbreak in high wind conditions thus preventing sail effect, tearing and generally preserving the integrity of the windbreak located throughout the orchard and/or vineyard in high wind conditions.

Orchard Applications

In an embodiment that is particularly useful for orchards, each sapling is surrounded by 2-24 vertically oriented arrays, with the vertical arrays at equidistance surrounding the sapling. The vertical arrays could be slender PVC pipes, or wooden stakes with tubes attached or some similarly vertically arranged conduit for the gas. The upright stakes would be sturdily attached to the ground and could be further attached to each other and or the sapling to provide structural integrity during high winds. The stakes with tubes and emitter are strategically positioned and semi permanently skated to the ground in a special array surrounding the sapling with a statistically weighted location based upon the prevailing wind directions during the growing season. For example they may be located strategically in hemispheres, quadrants, or triangulated surrounding the sapling. Each stake has at least one gas emitter and preferably and adjustable length vertical any of emitters. The arrays are controllable by quadrant based upon any given days wind direction, speed and light. If the wind is from the west the upwind quadrant is activated and the downwind quadrant is deactivated. If there is no wind the gas delivery can desirably occur throughout all quadrants. Quadrant activation could occur in a number of ways. For example, more than one distribution tape down the row of trees or vineyard, with the various quadrants being each hooked in the same manner down the row. Then when one tube is pumping gas, the same quadrant is active all the way down the row. When the wind if from the other direction and different tube is actuated, and when no wind is present all delivery tubes can be actuated. Alternatively a manifold connecting the main delivery tube to two or more quadrants vertical arrays and a micro valve could be used at each sapling that would control the quadrants actuation at each sampling.

Vineyard Applications

In vineyards, preexisting irrigation tubes are often suspend to allow cleaning, harvesting and work to occur on the ground under the suspended grapevines. The irrigation tube is always suspended on the lower wire closest to the ground. Further, vineyards employ woodpecker type nozzle tip emitters that are generally high flow and positioned to address the roots of the crop. In t an embodiment of the invention designed for vineyard application, the gas distribution tube or tape is suspended on the top wire where the grapevine is mainly supporting the leafy structure of the plant. Preferably low flow emitters would be used and the emitters would be desirably on a much closer spacing than the irrigation system, affording the gas to be contagiously enjoyed by the grapevine down its length of foliage.

Variations are Permissible

The elements of the invention are variable for deployment in a variety of applications. One variation embodiment is the use of a detachable section of pipe, with a first detachment located at the base of the tree and a second detachment located well up the trunk/above where the mechanical shakers grab the tree. A farmhand would go along and remove the pipe or tube sections prior to harvesting, and then replace them after harvesting; in an alternative embodiment a single detachment point could be using either at the base of the tree or above the mechanical engagement point, if the pipe was flexible tubing. In this version the tubing would then be bent out of the way as to not inhibit harvesting and then straighten out and reattached after harvesting. A second embodiment involves placing a section of attached coil tubing on the trunk of each tree. When the harvester comes along the tube is uncoiled and allowed to bend around the harvesting device. A third embodiment involves tubes suspended down the row in the canopy of the trees, thus not impeding the harvesting machines at all. A fourth embodiment involves providing an offset device approach wherein the tube is not proximate to the trunk where the harvester grabs the tree. A fifth embodiment involves placing a guard over the pipe/tube when the tree is engaged by the harvester. This way the step of detaching pipes could be avoided. The guard would protect the pipe from getting crushed or crimped by the jaws and/or tray of the mechanical harvester when it engages the tree. A sixth embodiment involves, alternatively, and/or in conjunction with the fifth embodiment, the machine could have a notched out area allowing the upwardly depending conduit to pass through the harvester when the tree trunk is engaged by the harvester without crushing or crimping said conduit.

In connection with systems for orchards, a method of use of the system and devices of the invention is preferably a two step process. At the juvenile sapling stage, stakes are deployed and then these mechanism are moved to another young orchard. At the maturation stage the tubes are then permanently suspended in the trees to allow mechanical harvesting to proceed unimpeded. If it is a hand picked fruit (i.e., no mechanical shakers/harvesters) then it may be advantageous to continue to go up the trunk of the tree into the bole with the tubes. Going up the trunk of the tree has the added advantage of not disrupting the annual pruning of the trees.

Although the systems, apparatus, and method have been described in connection with the field of commercial agriculture in fruit and nut orchards, citrus orchards, crops and vineyards, it can readily be appreciated that it is not limited solely to such field(s), and can be used in other fields and applications.

Further aspects and benefits of the device, system and method, include, but are not limited to:

1. The vertical gaseous release occurs in close proximity only to the leafy area of the tree or vine, in and upwind side of the foliage approximate distance of zero to 24 inches on the predominant prevailing wind during the summer primary growing months on the in a quadrant up to approximately ⅓ of the sphere of the tree bole.
2. A rigid vertical device that supports vertical transmission of the gas is also used to support the sapling or tree. The vertical rigid device may be telescoping to allow the seasonal vertical ascension of gas to address the trees' upward foliar growth
3. Conduit having one or more feet of slack intentionally left in the line, that the vertical conduit maybe extended upwardly in future seasons as the trees grow, without having to slice the line.
4. An emission array providing additional ancillary conduit off the end of the actively emitting array, that is either charged with gas with no emitters, or uncharged with gas by a removable restrictive blockage, providing for the emitter array to be activated to a great length in future seasons as the tree grows, without splicing or adding adaptors. The vertical array and rigid device preferably incorporates a small vertically rectangular wedge shaped wind sheltering device who's middle vertical axis point, depends exactly into the prevailing wind direction during the summer growing months and who's outer vertical edges are downwind of the middle axis defining an angle from the middle axis to downwind edges that shields and diverts breezes and wind around the foliage, therein creating a fluid/wind eddying effect that empowers retention of the preferred gaseous media and CO2 gas released into the leeward side of the wind shield within the foliar area. The gaseous release array can become taller and expanded as the foliar canopy grows taller and becomes larger.
5. The gaseous release system is controlled by prevailing wind direction.
6. For $CO_2$ release, there first should be light; second temperature should be above 80 degrees; wind may be from predominant prevailing direction quadrant i.e. gas has to become available to the individual tree; wind has to be less than 10 mph dependent on the cost of the gas.
7. Moving the ground tubes into a permanent aerial location on the upwind leading side of the trees, from tree to tree, once the trees mature and become hardy enough to support said tubes.
8. When the orchard is managed in hedgerows configuration, as in the case of mandarin orange species, versus individual trees the tubes may initially be located in an above ground position from the beginning due to the closer proximity of the planting configuration in rows.

9. In a preferred embodiment, additional quadrants of emitters can be added whose on/off operation can be controlled be increasing or decreasing the pressure in the delivery system with those quadrants being activated only when wind direction dictates suing a pressure actuated valve.

10. A device to effectively deflects the prevailing wind creating a wind-eddy around a substantial portion of a planting of juvenile permanent plantings so as to establish a beneficial microclimate thereabout the foliar canopy as contemplated and/or shown herein and/or described above, including equivalents thereof.
11. A system to effectuate temporary retention of gaseous media around a substantial portion of a foliar planting of juvenile permanent crop plantings throughout the juvenile growth phase and beyond so as to establish a beneficial microclimate thereabout as contemplated and/or shown herein and/or described above, including equivalents thereof.
12. A method to effectively improving gas enrichment in a substantial portion of a planting of juvenile permanent crop plantings throughout the juvenile growth phase and beyond so as to establish a beneficial microclimate thereabout as contemplated and/or shown herein and/or described above, including equivalents thereof
13. A readily alterable structure to effectively deflect wind and embellish gaseous retention around a substantial portion of the foliar portion of a sapling throughout at least its initial years of growth so as to establish a beneficial microclimate thereabout as contemplated and/or shown herein and/or described above, including equivalents thereof.
14. A kit for fabrication of a readily alterable structure to effectively embellish a substantial portion of a sapling foliar canopy throughout at least its initial years of growth so as to establish a beneficial microclimate thereabout as contemplated and/or shown herein and/or described above, including equivalents thereof.
15. A system for the delivery, application, and retention of an agent for enhancing growth and/or growth conditions of a sapling throughout at least its initial years of growth characterized by a source of the agent, an agent delivery network, agent dispensers and readily alterable structures to effectively embellish gas retention around a substantial portion of the sapling foliar canopy, the agent dispensers dispensing the agent interior of the structures as contemplated and/or shown herein and/or described above, including equivalents thereof.
16. A method to effectively surround a substantial portion of a sapling with a leeward wind-eddy throughout at least its initial years of so as to establish a beneficial microclimate thereabout as contemplated and/or shown herein and/or described above, including equivalents thereof.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim if any, is expressed as a means or step for performing a specified function it is intended that such claim be construed to cover the corresponding structure, material, or acts described in the specification and equivalents thereof including both structural equivalents and equivalent structures, material-based equivalents and equivalent materials, and act-based equivalents and equivalent acts.

What is claimed is:

1. A device for delivering a gas to an individual plant, comprising: an elongated, straight, vertical base adapted to be placed on a ground a predetermined distance from the individual plant and upwind from the individual plant, an emitter assembly adjustably disposed on the base, a gas supply conduit communicatively connected to the emitter assembly and adapted to be connected to a gas supply, and a vertically disposed wind foil, the wind foil having an upwind first face and a downwind second face, the emitter assembly being disposed on the second face of the wind foil towards the individual plant, whereby in use, as emitted from the emitter assembly away from the second face of the wind foil forms a gas envelope proximate at least a portion of the individual plant, and whereby the wind foil shields the gas envelope from wind so that it remains proximate at least a portion of the individual plant.

2. The device of claim 1 wherein the gas adapted to be delivered by the device is Carbon Dioxide ($CO_2$) gas.

3. The device of claim 1, wherein the base is a single member which has a single bottom end which is adapted to be placed on the top surface of the ground.

4. The device of claim 1, wherein the base is a single member which has a single bottom end that is adapted to be inserted into the ground a predetermined distance.

5. The device of claim 1 wherein the base has a predetermined vertical length.

6. The device of claim 5, wherein the base is a rigid stake.

7. The device of claim 5, wherein the base is a telescoping pole.

8. The device of claim 7, wherein the gas supply conduit comprises a hollow central lumen in the base telescoping pole.

9. The device of claim 1, wherein the emitter assembly is an emitter tape connected to the base, the emitter tape having at least one gas emission orifice.

10. The device of claim 1 wherein the wind foil is adjustably coupled to the base whereby its vertical position relative to the base and the individual plant may be varied.

11. The device of claim 10, wherein the wind foil is coupled to the base via a securement sleeve.

12. The device of claim 1, wherein the emitter assembly comprises at least one gas emission port communicatively connected to the gas supply conduit.

13. The device of claim 12, wherein the at least on gas emission port has a gas emitter channel connected to the second face of the wind foil, the gas emitter channel being connected to the gas supply conduit.

14. The device of claim 1, wherein the gas supply conduit is a hose connected at one end to a gas supply and at a second end to the emitter assembly.

15. The device of claim 1, wherein the wind foil has a curvilinear geometry with the first face having a convex configuration and the second face having a concave configuration.

16. A device for delivering Carbon Dioxide ($CO_2$) gas to an individual plant, comprising:

a. an elongated, straight, vertical base adapted to be placed on a ground a predetermined distance from the individual plant and upwind from the individual plant,
b. an emitter assembly adjustably disposed on the base,
c. a $CO_2$ gas supply conduit communicatively connected to the emitter assembly and adapted to be connected to a $CO_2$ gas supply, and
d. a vertically disposed wind foil, the wind foil having:
  i. an upwind first face,
  ii a downwind second face, and
  iii. a curvilinear geometry with the first face having a generally convex, configuration and the second free having a generally concave configuration, the emitter assembly being disposed on the second face of the wind foil towards the individual plant, whereby in use, $CO_2$ gas emitted from the emitter assembly away from the second face of the wind toil forms a $CO_2$ gas envelope proximate at least a portion of the individual plant, and whereby the wind foil shields the $CO_2$ gas envelope from wind so that it remains proximate at least a portion of the individual plant.

\* \* \* \* \*